(12) United States Patent
Szita (10) Patent No.: US 8,879,194 B2
(45) Date of Patent: Nov. 4, 2014

(54) CALIBRATION OF RAMP LOCATION IN A DISK DRIVE EMPLOYING SPIRAL-BASED SELF SERVO WRITING

(71) Applicant: Kabushiki Kaisha Toshiba, Tokyo (JP)

(72) Inventor: Gabor Szita, Mountain View, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 3 days.

(21) Appl. No.: 13/766,716

(22) Filed: Feb. 13, 2013

(65) Prior Publication Data

US 2014/0226227 A1   Aug. 14, 2014

(51) Int. Cl.
*G11B 21/02* (2006.01)

(52) U.S. Cl.
USPC .......................................................... 360/75

(58) Field of Classification Search
None
See application file for complete search history.

(56) References Cited

U.S. PATENT DOCUMENTS

| | | | | |
|---|---|---|---|---|
| 5,253,131 A | * | 10/1993 | Chevalier | 360/78.14 |
| 5,668,679 A | * | 9/1997 | Swearingen et al. | 360/75 |
| 6,009,052 A | * | 12/1999 | Hashimoto | 369/44.28 |
| 6,999,261 B2 | * | 2/2006 | Sugiyama et al. | 360/75 |
| 7,145,744 B1 | * | 12/2006 | Clawson et al. | 360/75 |
| 7,149,044 B1 | | 12/2006 | Chen et al. | |
| 7,209,312 B1 | | 4/2007 | Sutardja | |
| 7,349,171 B2 | | 3/2008 | Rutherford et al. | |
| 7,522,370 B1 | | 4/2009 | Sutardja | |
| 7,567,404 B1 | | 7/2009 | Rutherford et al. | |
| 7,751,144 B1 | | 7/2010 | Sutardja | |
| 7,995,305 B1 | | 8/2011 | Ton-That et al. | |
| 2005/0280916 A1 | | 12/2005 | Calfee et al. | |
| 2006/0005403 A1 | | 1/2006 | Calfee et al. | |
| 2006/0171058 A1 | * | 8/2006 | Chan et al. | 360/75 |
| 2008/0013202 A1 | * | 1/2008 | Shepherd et al. | 360/75 |

* cited by examiner

*Primary Examiner* — Paul Huber
(74) *Attorney, Agent, or Firm* — Patterson & Sheridan, LLP (57) ABSTRACT

The location of a load/unload ramp in a disk drive is calibrated by monitoring servo spirals that are crossed by a magnetic read/write head during an unload process. Monitoring the number servo spirals crossed allows an accurate velocity of the read/write head to be determined. Based on this unload velocity and the time elapsed during the unload operation, a distance between an ID crash stop position and the load/unload ramp can be calculated quickly and accurately.

20 Claims, 5 Drawing Sheets

CALIBRATION OF RAMP LOCATION IN A DISK DRIVE EMPLOYING SPIRAL-BASED SELF SERVO WRITING

BACKGROUND

1. Field

Embodiments described herein relate generally to data storage units, systems, and methods for calibration of load/unload ramp location in a disk drive.

2. Description of the Related Art

In a typical hard disk drive (HDD), servo sectors on the disk are used to provide position information about the location of a magnetic head over a disk surface. A common approach for writing such servo information on the disk is referred to as spiral-based self servo writing, or spiral-based SSW. According to this approach, spiral-shaped positioning signals (or "servo spirals") are written on the disk surface prior to the SSW process—typically by a dedicated self servo writing machine. During the SSW process, a magnetic head is positioned relative to a disk surface based on the spiral positioning signals, and the final servo information is written on the media by the disk drive heads.

Typically, a spiral based self servo write process starts at the inner diameter of the disk (ID) and proceeds toward the outer diameter (OD), where a load/unload ramp is used to unload the magnetic heads from the disks. It is generally desirable to stop the servo writing process at a specified minimum distance from the load/unload ramp, which is located at the OD. However, because there is relatively high tolerance on load/unload ramp location relative to the ID of the disk, the actual distance therebetween varies significantly from drive to drive. Consequently, calibration of the location of the load/unload ramp relative to the ID before the self servo write process begins is desirable. Alternatively, the SSW process can be performed without a calibrated distance between the load/unload ramp and the ID of the disk, but must be ended at a distance far enough from the OD of the disk to accommodate a worst case scenario in the possible position of the load/unload ramp, which leaves an undesirably large portion of most disks unused after the SSW process.

A possible approach to calibrate the load/unload ramp location is to use the servo spirals to position the magnetic head while moving the magnetic head actuator from the ID crash stop toward the load/unload ramp. The servo spirals enable head position to be accurately tracked, and therefore the load/unload ramp location is accurately determined when the magnetic head actuator reaches the load/unload ramp. However, spiral based position feedback systems seriously limit the maximum velocity by which a magnetic head actuator can be moved, requiring on the order of 30 minutes to move the actuator from disk ID to disk OD while servoing on the spirals. This significantly increases factory test time and increases production cost. Furthermore, moving the magnetic head actuator up the ramp at such a slow radial velocity is highly undesirable, since the magnetic head being used to servo on the spirals remains for an extended period of time in a "break-away" region in which the fly-height of the magnetic head becomes unstable.

Accordingly, there is a need in the art for reducing calibration time of the load/unload ramp in a disk drive.

SUMMARY

One or more embodiments provide systems and methods for calibrating a location of a load/unload ramp in a disk drive and performing an SSW process based on the calibrated load/unload ramp location.

A method of writing servo information for data tracks on a data storage disk having a plurality of servo spirals formed thereon, according to an embodiment, includes the steps of monitoring (1) a number of servo spirals crossed until a magnetic read head actuator reaches an unload ramp and (2) a time that elapses until the magnetic read head actuator reaches the unload ramp, computing a radial distance traveled by the magnetic read head actuator, and, using a servo self-write process, writing servo information on the data storage disk using the computed radial distance traveled by the magnetic read head actuator. Monitoring the number of servo spirals and the elapsed time occurs while moving a magnetic read head actuator radially across a surface of the data storage disk toward an unload ramp. The radial distance traveled by the magnetic read head actuator is based on the number of servo spirals crossed and the time elapsed.

A data storage device, according to another embodiment, comprises a data storage disk and a controller. The controller is configured to, while causing a magnetic read head actuator to move radially across a surface of the data storage disk toward an unload ramp, monitor (1) a number of servo spirals crossed until the magnetic read head actuator reaches the unload ramp and (2) a time that elapses until the magnetic read head actuator reaches the unload ramp. The controller is further configured to, based on the number of servo spirals crossed and the time elapsed, compute a radial distance traveled by the magnetic read head actuator, and, using a servo self-write process, cause servo information to be written on the data storage disk using the computed radial distance traveled by the magnetic read head actuator.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
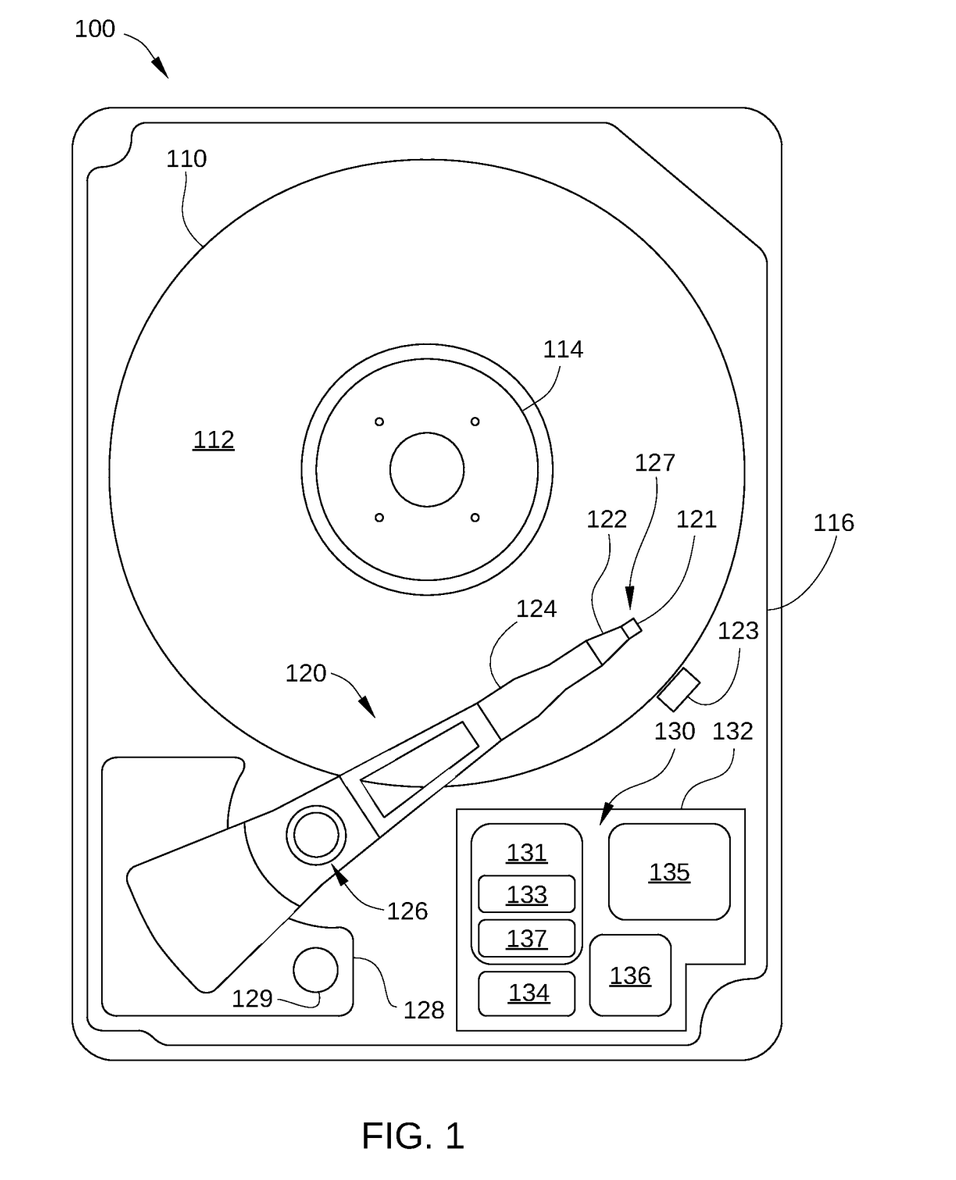
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes at least one storage disk 110 that is rotated by a spindle motor 114 and includes a plurality of concentric data storage tracks 220, which are disposed on a surface 112 of storage disk 110 and are described below in conjunction with FIG. 2. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over the desired concentric data storage track 220. Spindle motor 114, read/write head 127, and voice coil motor 128 are coupled to electronic circuits 130, which are mounted on a printed circuit board 132. Electronic circuits 130 include a read channel 137, a microprocessor-based controller 133, random-access memory (RAM) 134 (which may be a dynamic RAM and is used as a data buffer) and/or a flash memory device 135, and a flash manager device 136. In some embodiments, read channel 137 and microprocessor-based controller 133 are included in a single chip, such as a system-on-chip 131. In some embodiments, HDD 100 may further include a motor-driver chip for driving spindle motor 114 and voice coil motor 128.

HDD 100 also includes an inner diameter (ID) crash stop 129 and a load/unload ramp 123. ID crash stop 129 is configured to restrict motion of actuator arm assembly 120 to preclude damage to read/write head 127 and/or storage disk 110. Load/unload ramp 123 is typically disposed proximate the outer diameter (OD) of storage disk and is configured to unload read/write head 127 from storage disk 110. Typically, at the beginning of the SSW process, actuator arm assembly 120 is pushed against ID crash stop 129, so that ID crash stop 129 serves as a position reference at the start of the SSW process.

For clarity, HDD 100 is illustrated with a single storage disk 110 and a single actuator arm assembly 120. HDD 100 may also include multiple storage disks and multiple actuator arm assemblies. In addition, each side of storage disk 110 may have an associated read/write head coupled to a flexure arm.

Figure 2:
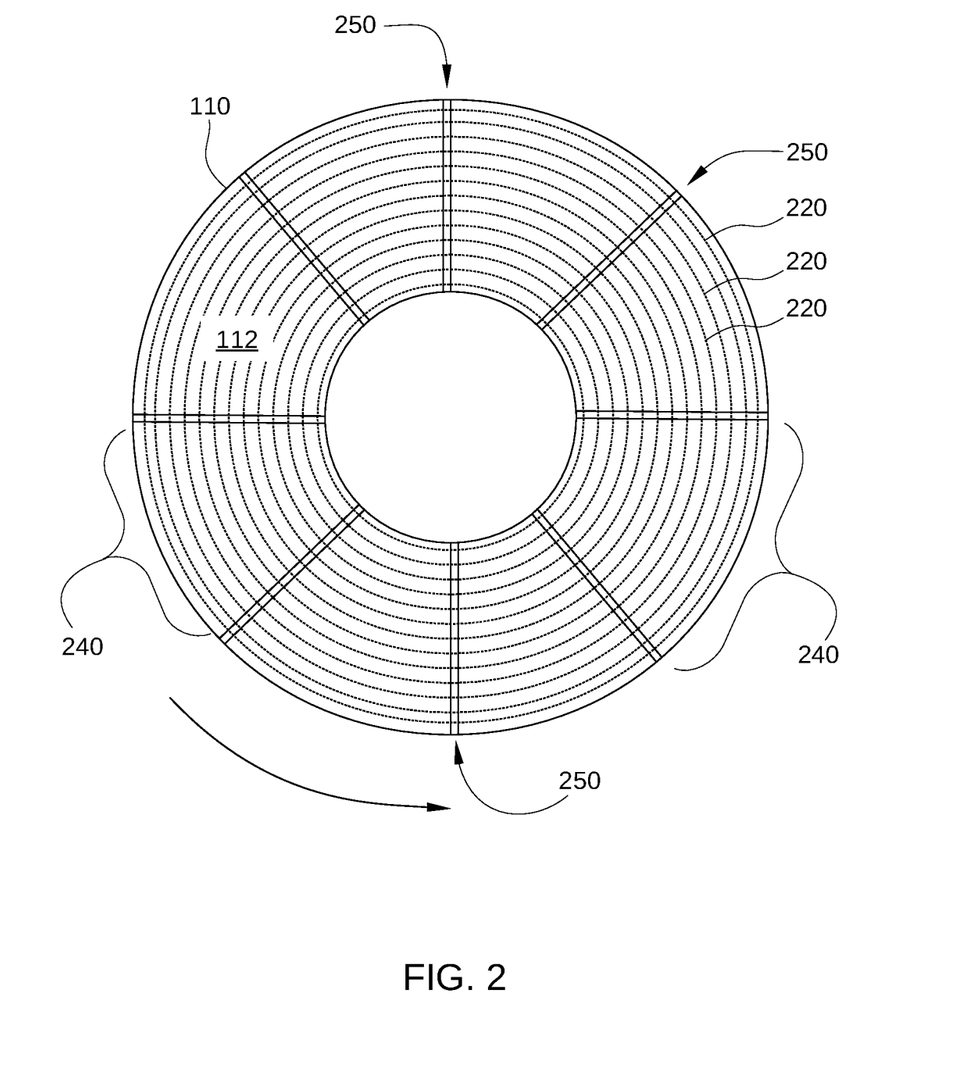
FIG. 2 illustrates a storage disk with data organized thereon in a typical manner after a hard disk drive has performed self servo-write.

FIG. 2 illustrates storage disk 110 with data organized thereon in a typical manner after HDD 100 has performed self servo-write (SSW). Storage disk 110 includes concentric data storage tracks 220 located in data sectors 240 that are configured for storing data and which are positionally defined by servo information written in servo wedges 250 during SSW. Each of concentric data storage tracks 220 is schematically illustrated as a centerline, but in practice occupies a finite width about a corresponding centerline. Substantially radially aligned servo wedges 250 cross concentric data storage tracks 220 and contain servo information in servo sectors in concentric data storage tracks 220. Such servo information includes a reference signal, such as a sinusoidal wave of known amplitude, that is read by the read/write head 127 during read and write operations to position the read/write head 127 above a desired track 220. In practice, servo wedges 250 may be somewhat curved, for example, configured in a shallow spiral pattern, but such a spiral pattern should not be confused with the servo spirals used during SSW to generate servo wedges 250. Typically, the actual number of concentric data storage tracks 220 and servo wedges 250 included on storage disk 110 is considerably larger than illustrated in FIG. 2, for example on the order of 200 or 300.

In order for HDD 100 to perform SSW, position and timing information must be provided to the disk drive servo system of HDD 100 so that HDD 100 can write servo wedges 250 onto storage disk 110 with the necessary precision for proper operation of HDD 100. To that end, an external servo track writer may be used to write a plurality of spiral tracks or "servo spirals" to the disk, where these servo spirals contain sufficient timing and position information for the internal servo system of disk drive 10 to subsequently write servo wedges 250 on storage disk 110 by a self-servo write (SSW) process. Because the requisite servo spirals can be written on a disk relatively quickly, the time each disk spends on such an external servo track writer is minimized. During SSW, the servo system of HDD 100 uses the timing and position information contained in the servo spirals to servo precisely over the radial position on storage disk 110 corresponding to each concentric data storage track 220 and thereby write the final servo wedges 250 onto storage disk 110 one radial position at a time. Specifically, read head of HDD 100 is used to read position and timing information from the servo spirals and the write head is used to write servo wedges 250.

Figure 3:
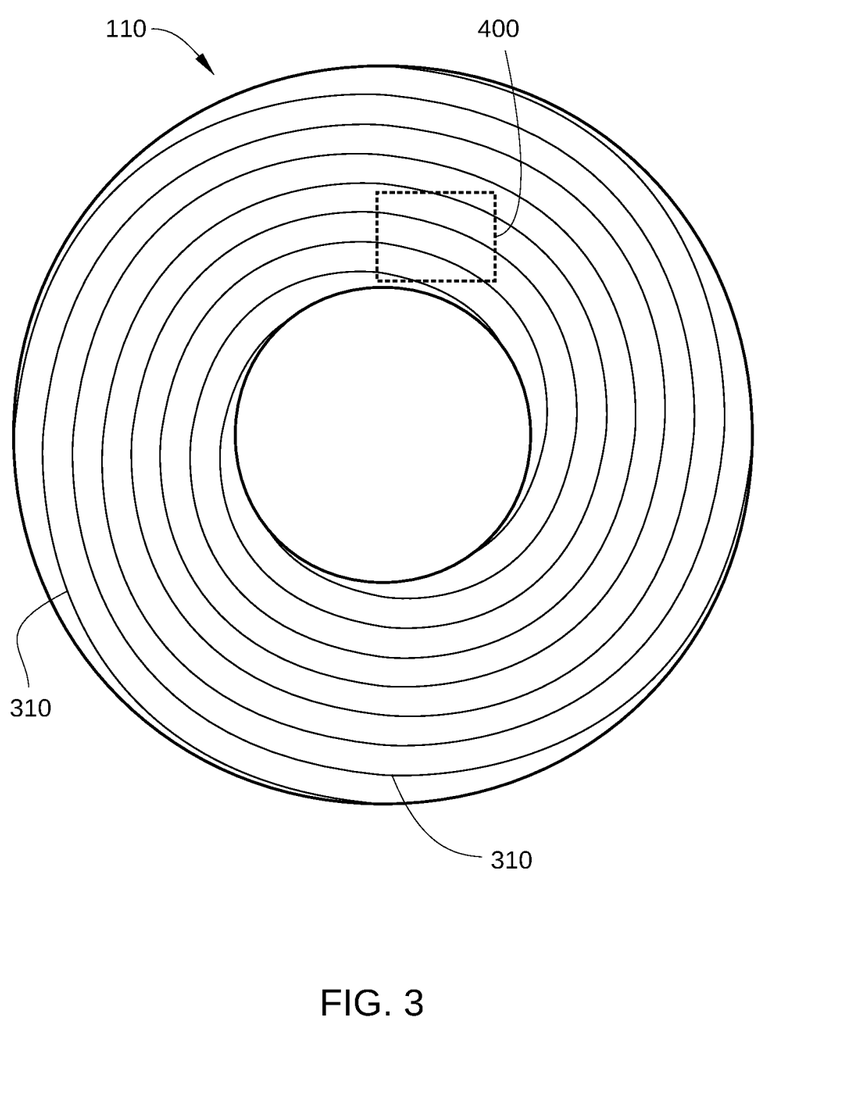
FIG. 3 illustrates a storage disk prior to undergoing a SSW process.

FIG. 3 illustrates storage disk 110 prior to undergoing a SSW process. As shown, storage disk 110 has a plurality of servo spirals 310 written thereon that are circumferentially spaced from adjacent servo spirals by a substantially equal spacing. It is noted that the number of servo spirals on storage disk 110 is typically relatively large, thus the actual number of servo spirals 310 written on storage disk 110 is considerably larger than that illustrated in FIG. 3. It is further noted that the "steepness" of servo spirals 310 may be greater or less than that illustrated in FIG. 3. For example, servo spirals 310 may instead be written at a very "shallow" angle, i.e., over multiple revolutions of storage disk 110.

Embodiments described herein provide systems and methods for calibrating the position of a load/unload ramp in an HDD in a time-efficient fashion. Specifically, the location of the load/unload ramp 123 in FIG. 1 can be accurately determined relative to the location of read/write head 127 when read/write head 127 is positioned as close as possible to the ID of storage disk 110, i.e., when actuator arm assembly 120 is in contact with ID crash stop 129 (hereinafter referred to as the "ID crash stop position"). By activating continuous spiral search mode and then moving read/write head 127 from the ID crash stop position to load/unload ramp 123, the location of load/unload ramp 123 relative to the ID crash stop position can be accurately determined in less than about 1 second. An embodiment of this technique is described below in conjunction with FIG. 4.

Figure 4:
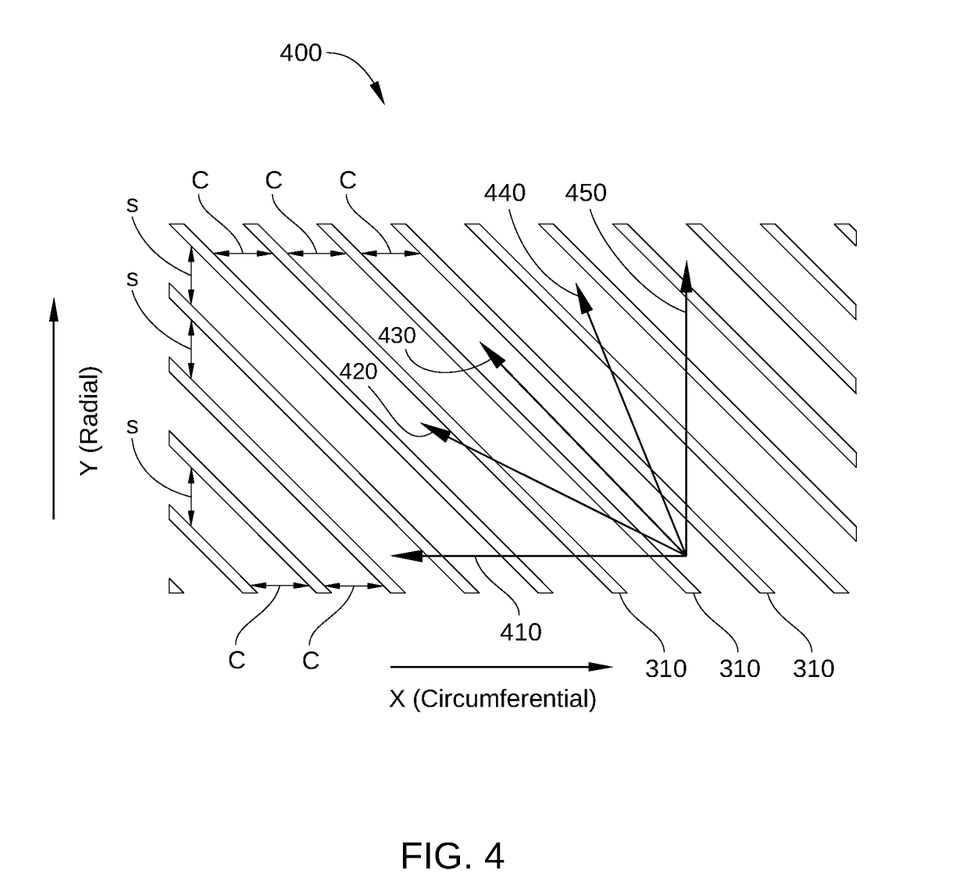
FIG. 4 is a schematic illustration of a portion of a storage disk indicated in FIG. 3 prior to undergoing a SSW process, according to one embodiment.

FIG. 4 is a schematic illustration of a portion 400 of storage disk 110 indicated in FIG. 3 prior to undergoing a SSW process. As shown, a plurality of servo spirals 310 are formed on storage disk 110. Also shown are arrows indicating various head trajectories 410, 420, 430, 440, and 450 of read/write head 127 when read/write head 127 moves with respect to storage disk 110 and servo spirals 310 at various radial velocities. It is noted that the positions of servo spirals 310 and head trajectories 410, 420, 430, 440, and 450 over portion 400 are based on an assumed constant rotational velocity of storage disk 110.

For purposes of description, FIG. 4 is a representation of portion 400 of storage disk 110 in which radial displacement (the y-axis) is displayed in terms of linear displacement, such as millimeters, but circumferential displacement (the x-axis) is not. Specifically, displacement along the x-axis in FIG. 4 is representative of an elapsed time of travel for read/write head 127, assuming a constant rotational velocity of storage disk 110. In this way, servo spirals 310, or more accurately, a time at which read/write head 127 passes over each of servo spirals 310, can be depicted as parallel lines in FIG. 4. In other words, because servo spirals 310 can be assumed to be circumferentially separated from each other by a substantially uniform angular separation at any radial location on storage disk 110, and, because a constant rotational velocity is assumed for storage disk 110, servo spirals 310 can be depicted as parallel lines in FIG. 4; at any radial location, a time required for read/write head to travel from one to another of servo spirals 310 is always a constant time interval C.

As shown, time interval C is constant between different servo spirals 310 and at different radial (i.e., y-axis) locations on storage disk 110. This is in contrast to a more physical depiction of servo spirals 310, in which the physical spacing between any two adjacent servo spirals 310 varies as a function of radial (y-axis) location. Also, because storage disk 110 can be assumed to rotate at a constant rotational velocity, when read/write head 127 is moved across storage disk 110 at any fixed radial velocity (or "unload velocity"), the time required for read/write head 127 to traverse the radial spacing s between any two adjacent servo spirals 310 is substantially the same. Similarly, and as noted above, because each of servo spirals 310 is separated from adjacent servo spirals 310 by substantially the same circumferential distance in angular arc, the time required for read/write head 127 to traverse the circumferential distance between two servo spirals 310, i.e., time interval C, is the same regardless of radial (y-axis) location on storage disk 110. Therefore, in FIG. 4, servo spirals 310 are depicted as parallel lines and time interval C is shown as a constant value at different radial locations and between different servo spirals 310.

Head trajectory 410 indicates a trajectory of read/write head 127 with respect to storage disk 110 and servo spirals 310 when read/write head 127 is stationary, that is, when read/write head 127 has zero radial velocity while storage disk 110 rotates at a constant radial velocity. Because read/write head 127 has zero radial velocity, head trajectory 410 has no y-axis component, and therefore is oriented parallel to the x-axis. Thus, the number $N_1$ of servo spirals 310 crossed by read/write head 127 during a time t, when held at a constant radial position over storage disk 110, is expressed by Equation 1:

$$N_1 = t*n*r \tag{1}$$

where n=the number of servo spirals written on data storage disk 110, and r=the number of disk rotations per second.

In contrast to head trajectory 410, head trajectory 450 indicates a trajectory of read/write head 127 with respect to storage disk 110 and servo spirals 310 when storage disk 110 is stationary, i.e., not rotating, and read/write head 127 is translated across storage disk 110 radially from the ID crash stop position to load/unload ramp 123. Hereinafter, the action of radially translating read/write head 127 across storage disk 110 radially from the ID crash stop position to load/unload ramp 123 is referred to as "unloading." Because head trajectory 450 has no circumferential, (x-axis) component, the number $N_2$ of servo spirals 310 crossed by read/write head 127 following head trajectory 450 while unloading during a time t is expressed by Equation 2:

$$N_2 = d/s \tag{2}$$

where d=the distance between the ID crash stop position and load/unload ramp 123, and s=the radial spacing in FIG. 4 between adjacent servo spirals 310.

It is noted that head trajectory 450 is generally a conceptual head trajectory that is illustrated for purposes of mathematical definition; in practice read/write head 127 generally cannot follow head trajectory 450 since HDD 100 is typically not designed for operation when storage disk 110 is stationary. It is further noted that, due to the manner in which servo spirals 310 are typically written on storage disk 110, radial spacing s is generally constant between each of servo spirals 310 at essentially any location on storage disk 110. Moreover, and as noted previously, each of servo spirals 310 is separated from adjacent servos spirals 310 by the same time interval C. Consequently, servo spirals 310 form a series of parallel lines in FIG. 4.

Head trajectory 430 indicates a trajectory of read/write head 127 with respect to storage disk 110 and servo spirals 310 that substantially matches the spiral slope of servo spirals 310 as depicted in FIG. 4. The spiral slope is the slope of servo spirals 310 shown in FIG. 4 and is the rate of change of the y-axis value of servo spirals with respect to the x-axis value thereof. Furthermore, the value of the spiral slope is the result of an effective spiral write velocity, which is the radial velocity at which a media writer would move relative to storage disk 110 to produce servo spirals 310 as shown, assuming that storage disk 110 rotates at the same rotational velocity when writing servo spirals 310 as when unloading read/write head 127. It is noted that, in practice, storage disk 110 is generally rotated at a significantly slower rate during the writing of servo spirals 310, so the "effective spiral write velocity" referenced herein is the theoretical effective spiral write velocity described above rather than the actual radial velocity at which the media writer used to write servo spirals 310 moves relative to storage disk 110. The effective spiral write velocity $V_s$ for servo spirals 310 can be calculated using Equation 3:

$$V_s = n*s*r \tag{3}$$

According to some embodiments, a distance between the ID crash stop position and load/unload ramp 123 can be determined by the following operation: unloading read/write head 127 from the crash stop position, counting the number of servo spirals 310 read/write head 127 crosses to determine velocity thereof, and using the velocity and the time elapsed during the unload operation to calculate the distance. The number of servo spirals 310 crossed can be determined by activating continuous spiral search mode, a feature that a disk drive capable of SSW is generally configured with. Once continuous spiral search mode is activated, read channel 137 in FIG. 1 sends an appropriate signal to controller 133 whenever a servo spiral is detected. Then, actuator arm assembly 120 moves read/write head 127 across from the ID crash stop position to load/unload ramp 123. Given the unload time, the total number of spirals detected, and the constant rotation velocity of storage disk 110, the distance between the ID crash stop position and load/unload ramp 123 can be readily calculated. In some embodiments, said distance is calculated by substituting Equations 1 and 2 into Equation 4:

$$N = N_1 - N_2 = t*n*r - d/s \tag{4}$$

When the unload velocity of read/write head 127 is lower than the spiral slope, N is positive and the unload velocity results in read/write head 127 following a track trajectory that substantially corresponds to head trajectory 420 in FIG. 4. In this case, solving Equation 4 for distance d yields Equation 5:

$$d = s(t*n*r - N) \tag{5}$$

When the unload velocity of read/write head 127 is higher than the spiral slope, N is negative and the unload velocity results in read/write head 127 following a track trajectory that substantially corresponds to head trajectory 440 in FIG. 4. In this case, solving Equation 4 for distance d yields Equation 6:

$$d = s(t*n*r + N) \tag{6}$$

In an example embodiment, the number of servo spirals n written on data storage disk 110=260, the number of disk rotations r per second=120 and radial spacing s between adjacent servo spirals 310=2.8e-6. Consequently, per Equation 3, the effective spiral write velocity $V_s$=0.0874 m/s.

It is noted that when read/write head 127 follows head trajectory 430 during unloading, no servo spirals 310 are crossed during unload. This implies that when read/write head 127 follows head trajectory 430, counting the number of servo spirals 310 crossed by read/write head 127 per revolution of storage disk 110 generally should not be used as a method to accurately determine the radial velocity of read/write head 127 during unload. Conversely, when read/write head 127 follows a head trajectory that crosses a relatively large number of servo spirals during unloading, such as head trajectory 420 or 440, the accuracy of determining distance d using Equation 5 or 6 may be improved. In other words, when the unload velocity is significantly greater or less than the effective spiral write velocity $V_s$ (i.e., the spiral slope) of servo spirals 310, distance d can be computed with greater accuracy. Specifically, a favorably large number of servo spirals 310 are crossed when the unload velocity of read/write head 127 may be, for example, greater than about 1.5 times the effective spiral write velocity $V_s$, or less than about 0.5 times the effective spiral write velocity $V_s$.

In determining distance d using Equation 5 it is assumed that the unload velocity of read/write head 127 is lower than the spiral write velocity. Similarly, in determining distance d using Equation 6 it is assumed that the unload velocity of read/write head 127 is higher than the spiral write velocity. In certain velocity regions accurate counting of spiral crossings may be problematic. For example, as the radial velocity of read/write head 127 approaches that of the effective spiral write velocity $V_s$, very few of servo spirals 310 are crossed and therefore the unload velocity of read/write head 127 at that time generally cannot be calculated with meaningful accuracy. In practice, there is typically an acceleration period during which the velocity may be in such a problematic region for a brief period of time, and the spiral crossings cannot be determined accurately. Consequently, in some embodiments, calculation of distance d may also include the use of a correction factor that compensates for the unload velocity that generally occurs during an acceleration period at the beginning of unload that is close to the effective spiral write velocity $V_s$. Such a correction factor is generally highly specific to any particular configuration of HDD 100, and can be readily determined by one of skill in the art upon reading the disclosure provided herein.

Figure 5:
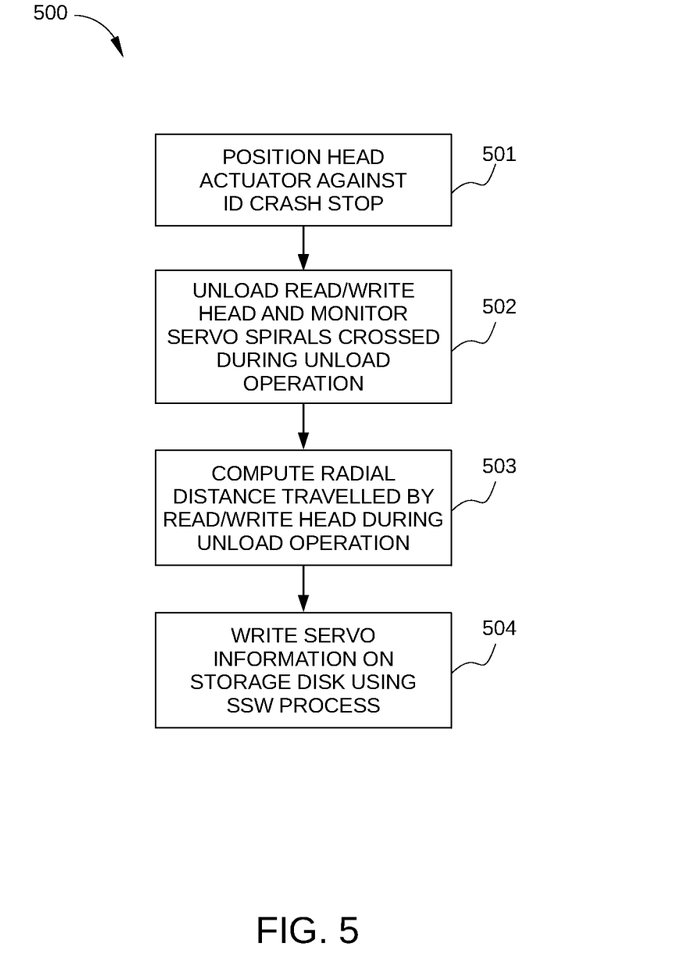
FIG. 5 sets forth a flowchart of method steps for writing servo information for data tracks on a data storage disk having a plurality of servo spirals formed thereon, according to embodiments.

FIG. 5 sets forth a flowchart of method steps for writing servo information for data tracks on a data storage disk having a plurality of servo spirals formed thereon, according to some embodiments. Although the method steps are described in conjunction with HDD 100 in FIGS. 1-4, persons skilled in the art will understand that method 500 may be performed with other types of systems. In some embodiments, prior to method 500, a plurality of servo spirals, such as servo spirals 310 in FIG. 3, are formed on the data storage disk. For example, a media writer apparatus may be used to form such servo spirals prior to the mechanical assembly of HDD 100. The control algorithms for method 500 may reside in controller 133, or, in some embodiments, an external host device that is temporarily coupled to HDD 100 and used to facilitate the calibration of HDD 100. For clarity of description, controller 133 is assumed to perform said control algorithms for method 500, although other external control devices can potentially be used in such a role.

As shown, method 500 begins at step 501, when controller 133 positions a magnetic head actuator of the disk drive, i.e., actuator arm assembly 120, against ID crash stop 129, which may be used as a position reference when starting the SSW process. Thus, in step 501, read/write head 127 is positioned in the ID crash stop position, so that read/write head 127 is as close to the ID of storage disk as possible. In addition, in some embodiments controller 133 activates a continuous spiral search mode in HDD 100. Alternatively, the continuous spiral search mode may be activated prior to method 500.

In step 502, controller 133 unloads read/write head 127, i.e., uses actuator arm assembly 120 to move read/write head 127 across storage disk 110 to load/unload ramp 123. In some embodiments, voice coil motor back electro-motive force control (also referred to as VCM back EMF control) is used to control voice coil motor 128 so that read/write head 127 moves across storage disk 110 from the ID crash stop position to load/unload ramp 123. While moving read/write head 127 in step 502 radially across storage disk 110 toward load/unload ramp 123, controller 133 monitors the number of servo spirals crossed and the time that elapses during the unload process. In this way, a highly accurate unload velocity can be quickly determined in step 503.

It is noted that while VCM back EMF control may be used to move actuator arm assembly 120 at an approximate desired velocity, the accuracy of said velocity is generally inadequate for calculating the distance between the ID crash stop position and load/unload ramp 123. For example, calculating said distance using the nominal unload velocity reported when using VCM back EMF to unload read/write head 127 can have error on the order of ±50,000 tracks. In contrast, an accuracy of only a few thousand tracks is generally desired to facilitate the highest utilization of the available surface of storage disk 110 for concentric data storage tracks 220.

In step 503, based on the number of servo spirals crossed in step 502 and on the time elapsed during the unload process, controller 133 computes a radial distance traveled by read/write head 127. In some embodiments, controller 133 also uses a correction factor that compensates for an acceleration period in which actuator arm assembly 120 moves read/write head 127 at a radial velocity across storage disk 110 that is relatively close to effective spiral write velocity $V_s$.

In step 504, using an SSW process, controller 133 writes servo information, such as servo wedges 250, on storage disk 110. Because controller 133 has accurate knowledge concerning the location of load/unload ramp 123 with respect to the ID crash stop position, i.e., distance d in Equations 5 and 6, controller 133 can write servo wedges 250 that extend to within a radial distance of load/unload ramp 123 within some desired safety margin. In some embodiments, controller 133 can write servo wedges 250 that extend to within a radial distance of load/unload ramp 123 that is less than a width of about two thousand of concentric data tracks 220 on storage disk 110.

For illustrative purposes, the embodiments herein describe calibration of the position of a load/unload ramp in terms of an unload operation, i.e., by moving read/write head 127 from ID crash stop 129 to load/unload ramp 123. Performing a calibration of a load/unload ramp can, in some embodiments, also be performed using a load operation, i.e., by moving read/write head 127 from load/unload ramp 123 to ID crash stop 129. Furthermore, a disk drive configured with a load/unload ramp at an inner diameter of a storage disk rather than at an outer diameter of the storage disk can also benefit from implementation of embodiments described herein.

In sum, embodiments described herein provide systems and methods for calibrating a location of a load/unload ramp in a disk drive and performing an SSW process based on the calibrated load/unload ramp location. By monitoring servo spirals crossed by a magnetic read/write head during an unload process, an accurate unload velocity of the read/write head can be determined. Based on this unload velocity and on the time elapsed during the unload operation, the distance between an ID crash stop position and the unload ramp can be calculated quickly and accurately. Advantageously, the calibrated crash stop position allows a SSW process to write servo data that maximizes utilization of the surface of the data storage disk.

While the foregoing is directed to embodiments of the present invention, other and further embodiments of the invention may be devised without departing from the basic scope thereof, and the scope thereof is determined by the claims that follow.

I claim:

1. A method of writing servo information for data tracks on a data storage disk having a plurality of servo spirals formed thereon, the method comprising the steps of:
    while moving a magnetic read head actuator radially across a surface of the data storage disk from a first radial position to a second radial position, monitoring (1) a number of servo spirals crossed until the magnetic read head actuator reaches the second radial position and (2) a time that elapses until the magnetic read head actuator reaches the second radial position;
    based on the number of servo spirals crossed and the time elapsed, computing a radial distance traveled by the magnetic read head actuator; and
    writing servo information on the data storage disk according to a servo self-write process, the servo self-write process using the computed radial distance traveled by the magnetic read head actuator.

2. The method of claim 1, further comprising, prior to moving the magnetic read head actuator radially across the surface of the data storage disk toward the second radial position, positioning the magnetic head actuator against an inner crash stop.

3. The method of claim 2, wherein moving the magnetic read head actuator radially comprises moving the magnetic read head actuator away from the inner crash stop.

4. The method of claim 1, wherein monitoring the number of servo spirals comprises activating a continuous spiral search mode in a storage device that includes the data storage disk.

5. The method of claim 4, wherein the continuous spiral search mode comprises using a read channel of the data storage device to search for servo spirals and send an appropriate signal when a servo spiral is detected.

6. The method of claim 1, wherein the first radial position is disposed at a location proximate an inner diameter of the data storage disk and the second radial position is disposed at a location proximate an outer diameter of the data storage disk.

7. The method of claim 1, wherein moving the magnetic read head actuator radially comprises moving the magnetic read head actuator from an inner crash stop to an unload ramp.

8. The method of claim 1, wherein moving the magnetic read head actuator radially comprises moving the magnetic read head actuator radially using voice coil motor back electro-motive force control.

9. The method of claim 1, wherein the first radial position is disposed at a location proximate an outer diameter of the data storage disk and the second radial position is disposed at a location proximate an inner diameter of the data storage disk.

10. The method of claim 1, wherein computing the radial distance is based on a servo spiral slope.

11. The method of claim 1, wherein computing the radial distance comprises using a correction factor that compensates for an acceleration period of the magnetic read head actuator.

12. A data storage device, comprising:
    a data storage disk; and
    a controller configured to:
    while causing a magnetic read head actuator to move radially across a surface of the data storage disk from a first radial position to a second radial position, monitor (1) a number of servo spirals crossed until the magnetic read head actuator reaches the second radial position and (2) a time that elapses until the magnetic read head actuator reaches the second radial position;
    based on the number of servo spirals crossed and the time elapsed, compute a radial distance traveled by the magnetic read head actuator; and
    write servo information on the data storage disk according to a servo self-write process, the servo self-write process using the computed radial distance traveled by the magnetic read head actuator.

13. The data storage device of claim 12, wherein the controller is further configured to, prior to moving the magnetic read head actuator radially across the surface of the data storage disk toward the second radial position, position the magnetic head actuator against an inner crash stop.

14. The data storage device of claim 13, wherein causing the magnetic read head actuator to move the magnetic read head actuator radially comprises causing the magnetic read head actuator to move the magnetic read head actuator away from the inner crash stop.

15. The data storage device of claim 12, wherein the controller is configured to monitor the number of servo spirals by activating a continuous spiral search mode in a storage device that includes the data storage disk.

16. The data storage device of claim 12, wherein the first radial position is disposed at a location proximate an inner diameter of the data storage disk and the second radial position is disposed at a location proximate an outer diameter of the data storage disk.

17. The data storage device of claim 16, wherein the controller is configured to move the magnetic read head actuator from an inner crash stop to an unload ramp.

18. The data storage device of claim 12, wherein the first radial position is disposed at a location proximate an outer diameter of the data storage disk and the second radial position is disposed at a location proximate an inner diameter of the data storage disk.

19. The data storage device of claim 12, wherein the controller is configured to compute the radial distance based on a servo spiral slope.

20. The data storage device of claim 12, wherein the controller is configured to compute the radial distance by using a correction factor that compensates for an acceleration period of the magnetic read head actuator.

* * * * *